United States Patent [19]

Shultz

[11] Patent Number: 4,997,197

[45] Date of Patent: Mar. 5, 1991

[54] SOFT SUSPENSION BICYCLE

[76] Inventor: G. Merle Shultz, 4202 Delta Ct., Englewood, Ohio 45322

[21] Appl. No.: 348,874

[22] Filed: May 8, 1989

[51] Int. Cl.$^5$ .............................................. B62K 25/22
[52] U.S. Cl. ..................................... 280/275; 280/277; 280/283; 280/284; 280/716
[58] Field of Search ............... 280/270, 275, 276, 277, 280/283, 284, 285, 716, DIG. 1; 180/227; 267/73, 141, 153, 175, 177

[56] References Cited

U.S. PATENT DOCUMENTS

| | | | |
|---|---|---|---|
| 1,077,105 | 10/1913 | Stewart | 280/285 |
| 1,333,449 | 3/1920 | Russell | 280/285 |
| 2,515,380 | 7/1950 | Pentecost | 280/716 |
| 2,976,056 | 3/1961 | Henry | 280/277 |
| 3,931,990 | 1/1976 | Knapp | 280/283 |
| 3,942,821 | 3/1976 | Bock | 280/277 |
| 4,540,190 | 9/1985 | Moulton | 280/278 |
| 4,744,434 | 5/1988 | Miyakoshi | 180/227 |

FOREIGN PATENT DOCUMENTS

| | | | |
|---|---|---|---|
| 350269 | 10/1904 | France | 280/285 |
| 0547006 | 11/1922 | France | 280/277 |

Primary Examiner—Charles A. Marmor
Assistant Examiner—A. M. Boehler

[57] ABSTRACT

A soft suspension bicycle including a pivotal front wheel mounted fork pivotally connected to the steerable fork and a rear pivotal structure having three pivotally interconnected cooperating components including an intermediate fork connected to a pivotal rear wheel mounted fork in adjacent relation to the axis of the rear wheel, the pivotal front wheel mounted fork and the pivotal intermediate fork are scalene quad triangular forks structurally efficient in the verticcal and transverse planes, and having front and rear brakes to produce a frame shifting torque simultaneously with braking, both front and rear pivotal comonents are suspended from the bicycle frame with resilient elastic suspenders and include front and rear indicators for indicating optimum tension of the suspenders after tension adjustments according to the weight of a rider.

9 Claims, 3 Drawing Sheets

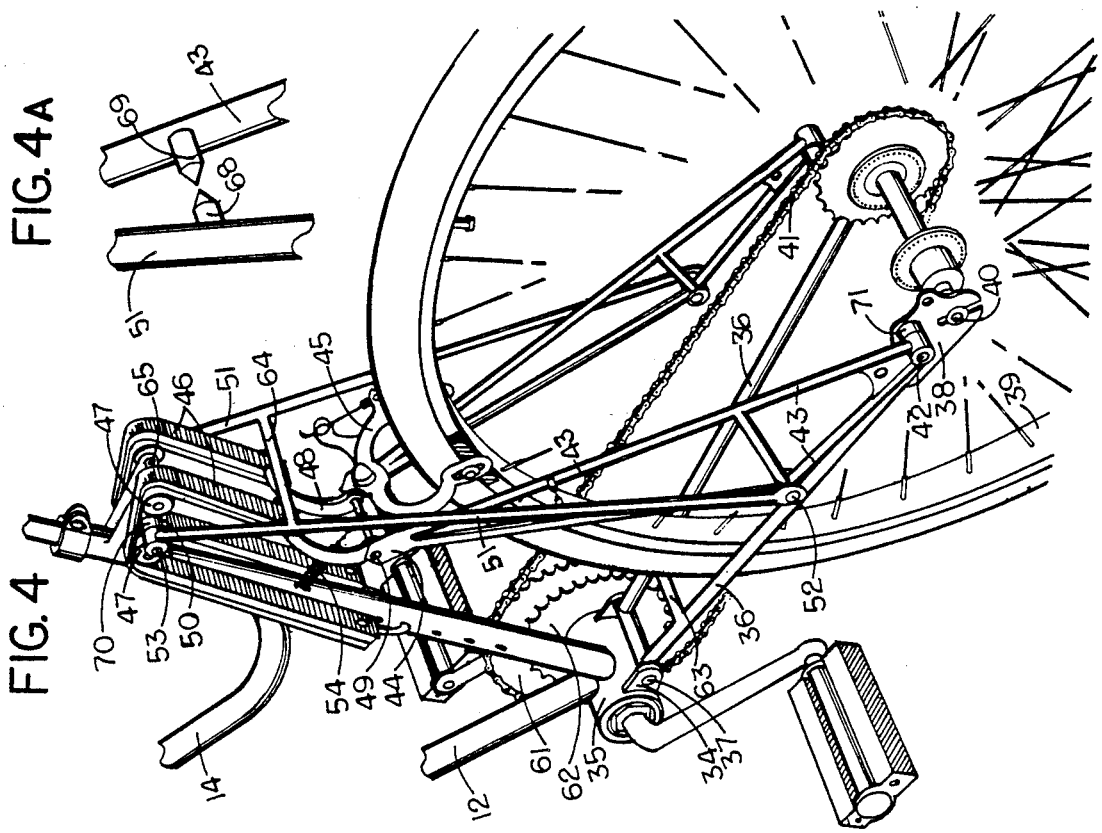
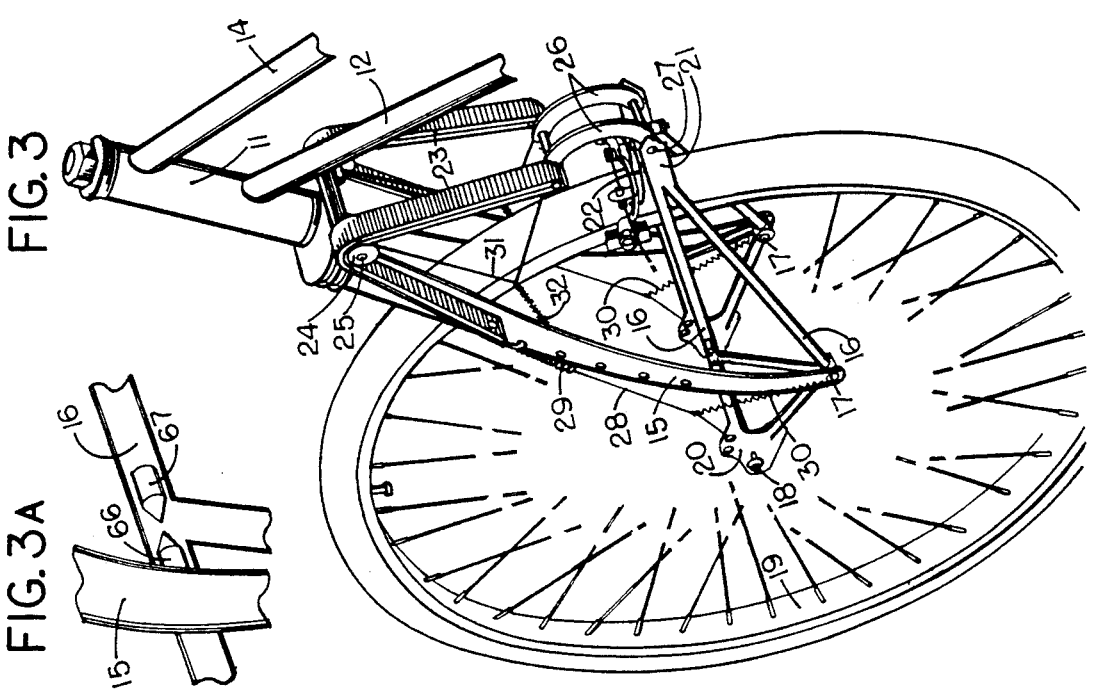

SOFT SUSPENSION BICYCLE

DESCRIPTION OF THE PRIOR ART

Various configurations of front, or rear, or front and rear flexible suspensions for bicycles have been tried, but despite some advantages, none appear to have caught the fancy of bicycle enthusiasts.

Most attempts appear on investigation to have obvious shortcomings. Some were too heavy, some designs made front braking difficult or impractical, some bikes would nosedive during normal firm braking, some were not compatible with popular multi-speed changers and most would not isolate the rider from shock when the front and/or rear wheel rolled over bumps.

Since the rider is in contact with the bicycle at the handlebars, seat and pedals, a shock at one or more of these jolts the rider.

A bicycle with only a flexible suspended rear wheel, operationally imposes shocks to the rider through the handlebars and pedals as the front wheel rolls over bumps, because connected elements between the front wheel and the handlebars are firm and fixed.

A bicycle with only a flexible suspended front wheel, operationally imposes shocks to the rider though the pedals and seat as the rear wheel rolls over bumps, because the rear frame is firm and fixed.

A bicycle with a central flexible suspension component such as in U.S. Pat. No. 3,931,990, operationally imposes shocks to the rider through the handlebars as the front wheel rolls over bumps, because connected elements between the front wheel and the handlebars are firm and fixed.

STATEMENTS OF OBJECTS OF THE INVENTION

This invention cures the above shortcomings and many more.

An object of this invention is to achieve soft front and rear suspension with effective front and rear braking.

Another object is to eliminate the hazard of nosedive on a soft suspension bicycle during braking by inverting nosedive.

A further objective is to provide a soft suspension bicycle that is compatible with standard, mass produced components such as wheels, tires, pedal cranks, pedals, drive chains, handlebars, brakes, multi-speed changers, seats and other standard components and accessories. This contributes to a lower cost, refined bicycle than one requiring custom built components as appears likely with the one in U.S. Pat. No. 4,540,190. An additional objective is to provide a rear pivotal structure that is compatible with standard multi-speed changers, without the need for a supplemental chain length compensator, as required with U.S. Pat. No. 2,976,056.

A still further objective is to provide for an improved resilient material with needed capabilities and advantages, for suspending front and rear pivoting components.

Another objective is to provide a novel means for defining optimum tension of the front and rear resilient suspension material according to the weight of the rider.

An additional objective is to provide an all-encompassing apparatus for a soft ride, so that weight saving components such as tires that are small diameter, high pressure, low weight, low rolling friction requiring small width wheels, and seats without heavy steel springs, can be used without sacrifice to the quality of the soft ride.

Other objects and advantages of this invention will be readily appreciated and better understood by reference to the following detailed description when considered in connection with accompanying drawings, in which like reference numbers designate like elements throughout the figures thereof and wherein.

SUMMARY OF THE INVENTION

The configuration of a bicycle chosen to disclose an improved soft suspension concept, is one that is especially suited to the mostly overlooked adult rider of both sexes. It has a low profile top tube for easier mounting and dismounting by the less agile riders, and a very large seat for comfort, and other amenities favored by adult riders. Other configurations and sizes of touring, racing and rough terrain bicycles, for riders of all ages, enhanced with this improved soft suspension concept, may require slight comparative dimensional tailoring without departing from the spirit or scope of this invention.

FIG. 3 and 4 are perspective views of the front and rear soft suspension apparatus in FIG. 1 and 2 here shown pivoted to the optimum tension position, ostensibly after correct adjustment of the front and rear resilient suspender tension according to, and under influence of the bicycle rider's weight.

FIG. 3a and FIG. 4a are separated parts of FIG. 3 and FIG. 4 respectively, in larger scale to more clearly show optimum tension indicators and definers in adjacent relationship.

DESCRIPTION OF THE PREFERRED EMBODIMENTS

Figure 1:
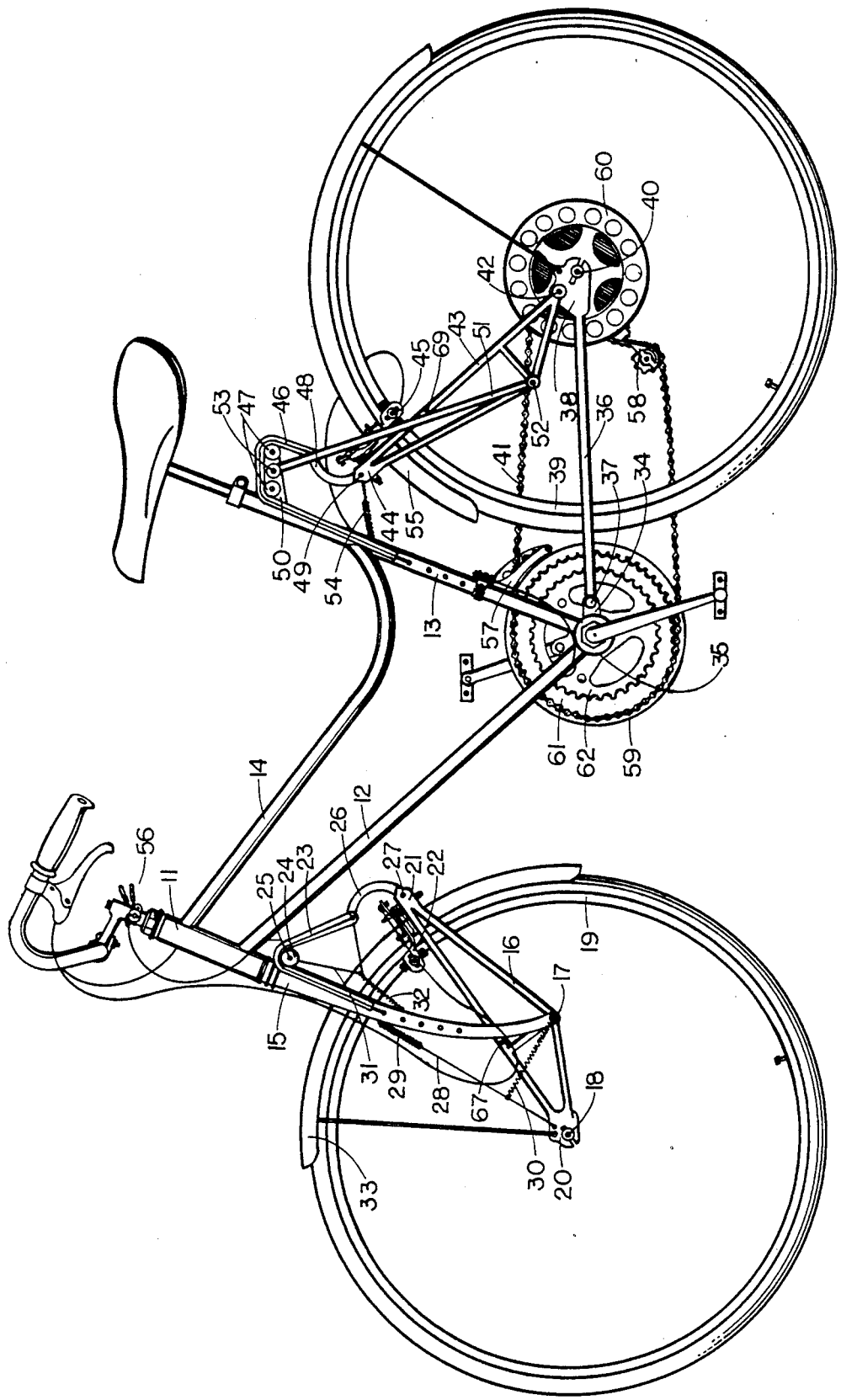
FIG. 1 is a side elevation of a bicycle employing the improved soft suspension concept according to this invention, shown here in an unmounted, preload pivotal mode.

Referring now to the drawings, there is shown more clearly in FIG. 1 a triangular central frame comprising; a head tube 11, down tube 12, seat tube 13 and low profile top tube 14, all well known.

A member of the frame is front steerable fork 15 journaled in bearings in the the head tube 11 and pivotally connected by its lower legs to a scalene quad-triangular, pivotal front wheel mounted fork 16 as its fulcrum support, with left and right fulcrum pins 17 journaled in bearings in the front wheel mounted fork 16. Front wheel pin 18 connects front wheel 19 to left and right front wheel mounting plates 20 where forward members of front wheel mounted fork legs merge. Rearwardly members are united by a shoulder connection bracket 21. A front caliper brake 22 is connected to the connection bracket 21. A pair of front, first resilient suspenders 23 suspends the front wheel mounted fork 16 from the frame. Fulcrum pins 17 are positioned favorably by the rearward cant of the steerable fork 15, to position the front wheel axis conventionally and beneficially forward of an imaginary substantially vertical centerline of the head tube 11, for optimum operating control, front wheel caster and easy steering.

The scalene quad-triangular pivotal front wheel mounted fork 16 provides maximum strength at the areas of maximum stress, with a low weight-to-strength ratio and is structurally efficient in the vertical and transverse planes. The triangular shape of each fork leg on either side of the front wheel 19 is triangular from the side elevation and additionally from the top, because the maximum lateral dimensions of the front wheel mounted fork 16 are at the fulcrum pins 17 and the front wheel plates 20, while the minimum lateral dimension is at the connection bracket 21. Hypotenuse members of the fork legs angle inwardly front the left and right wheel plates 20 and merge with the connection bracket 21 resulting in the triangular shape from the top as well as the side elevation. Two fork legs, each triangular from the top and side account for the quad-triangular designation.

The novel installation of the front, first caliper brake 22 connected to the shoulder connection bracket 21 of the pivotal front wheel mounted fork 16, allows the brake 22 to remain a fixed distance from the front wheel 19 in any allowable pivotal position of the front wheel mounted fork 16 and permits the advantages of front braking with liberal wheel flexing. The front brake 22 also produces a useful torque, as will be disclosed further in this text.

Forwardly ends of the front, first resilient suspenders 23 are coupled by left and right adjustment hooks inserted in one of a series of apertures in the legs of the steerable fork 15. Rearwardly ends of the resilient suspenders 23 are coupled to a pair of moon (shaped) extenders 26 connected by extender pin 27 to the connection bracket 21. The resilient suspenders 23 can be unhooked from the apertures and slipped away from the moon extenders 26 without tools, in a few seconds if and when an exchange for a different length and strength is desirable. The moon extenders 26 provide clearance for the resilient suspenders 23 from the first caliper brake 22 in any allowable pivotal position of the front wheel mounted fork 16.

The front, first pair of resilient suspenders 23 utilize a soft, operationally quiet, low weight, durable, efficient, lively elastic material characterized by rubber and elastomers, capable of retaining their longitudinal tensile strength for suspension when detoured over and around support rollers 24 connected at the shoulder of the steerable fork 15 by roller pin 25. Due to the short space between the forward ends of moon extenders 26 and the shoulder of the steerable fork 15, the detour of the resilient suspenders 23 permit a greater variety of lengths and strengths of the resilient suspenders 23 to adjustably match diverse weight possibilities of the rider. The detour also places the resilient suspenders 23 in optimum position for suspending the front wheel mounted fork 16 as it pivots between preload and maximum load positions. The resilient suspenders 23 retain their resiliency and longitudinal tensile strength despite the advantageous detour, as they alternately stretch and shrink from the dual-directional pivoting of the front wheel mounted fork 16.

A pair of preload limiting cables 28, each with a shock damping spring 29 limits pivoting of the front wheel mounted fork 16, under tension of the resilient suspenders 23, in the unload direction substantially at the preload pivotal position. This position cinches the front of the bicycle when unmounted for easier mounting and operationally minimizes bounce as the front wheel 19 hits bumps at higher speeds. The shock damping springs 29 soften the shock when the preload limiting cables 28 halts the pivotal movement of the front wheel mounted fork 16 in the unload direction as in normal, firm braking. The unload direction is the direction the wheel mounted fork 16 pivots when the rider dismounts.

Left and right small, first guide springs 30 coupled between the preload limiting cables 28 and the steerable fork 15, keep just enough tension on the preload limiting cables 28 when in their relaxed mode, to guide them away from operationally revolving spokes of front wheel 19. Left and right maximum load limiting cables 31 coupled between roller pin 25 and the moon extenders 26, limits pivoting of the front wheel mounted fork 16 in the maximum load direction, to prevent front wheel 19 or an optional fender from striking the inner shoulder of the steerable fork 15. The maximum load direction is the direction the wheel mounted fork 16 pivots when the rider mounts the bicycle. Second left and right guide springs 32, coupled between the steerable fork 15 and limiting cables 31, keep just enough tension on the load limiting cables 31, when in their relaxed mode, from interfering with adjoining components.

A pair of mounting flanges 34 are attached to the rearwardly side of pedal crank housing 35 to pivotally connect the forward end of a pivotal rear wheel mounted fork 36 to the mounting flanges 34 by flange pin 37 journaled in bearings in the forward end of rear wheel mounted fork 36. Rearward fork legs of rear wheel mounted fork 36 merge with wheel mounting plates 38 on either side of the rear wheel 39 which is connected to the wheel plates 38 by rear wheel pin 40.

Lower fork legs of a rear intermediate fork 43, are pivotally connected by left and right pivotal pins 42 to mounting studs attached to the wheel mounting plates 38 in adjacent relation to the rear wheel pin 40 as the axis for the rear wheel 39. The pivotal pins 42 are journaled in bearings in the lower fork legs of intermediate fork 43. Upper fork legs of the intermediate fork 43 are united by a shoulder connection bracket 44. A rear, second caliper brake 45 is connected to the connection bracket 44 and a pair of rear, second resilient suspenders 46 are coupled to it. The intermediate fork 43 is a scalene quad-triangular fork comparable to, and with strength-at-stress and low weight-to-strength ratio advantages, as previously disclosed for the front wheel mounted fork 16.

The novel installation of the rear, second caliper brake 45 connected to the shoulder of said intermediate fork 43, allows the brake 45 to substantially remain a fixed distance from the rear wheel 39 in any allowable pivotal position of intermediate fork 43.

Forwardly ends of the second pair of resilient suspenders 46 are coupled by adjustable hooks inserted in one of a series of apertures in left-and right sides of the seat tube 13. Rearwardly ends of the resilient suspenders 46 are coupled to a pair of rear, second moon extenders 48 which are connected by extender pin 49 to the shoulder connection bracket 44 for intermediate fork 43. The second pair of resilient suspenders 46 are detoured over and around left and right support rollers 47 connected to a seat tube positioning bracket 50. The rear resilient suspenders 46 utilize the same resilient materials for the same reasons, and have the same advantages as disclosed for the front, first suspenders 23.

A pivotal seat stay fork 51 is pivotally connected by its lower fork legs to the intermediate fork 43 as a fulcrum support of the intermediate fork 43 and pivotally connected by fulcrum pins 52 journaled in bearings in the intermediate fork 43. Upper fork legs of the seat stay fork 51 are pivotally connected by left and right stay pins 53 journaled in bearings in the upper fork legs of the seat stay fork 51 to left and right mounting studs attached to the seat tube positioning bracket 50.

Pivotal seat stay fork 51, pivotal intermediate fork 43 and pivotal rear wheel mounted fork 36 which comprises a rear pivotal structure that cooperates with each component associated with it to operationally perform without being hindered by the pivotal structure, and cooperates with each component included in it to accomplish numerous functions including the following:

The rear wheel mounted fork 36 supports and maintains alignment of the rear wheel 39 with the longitudinal axis of the bicycle, and maintains the distance equal to the space between the axis of the pedal crank and the axis of rear wheel 39 so that a snug adjustment of drive chain 41 is maintained during operational pivoting of rear wheel mounted fork 36 from the effects of the rear wheel 39 rolling over bumps, without the need for a supplemental chain length compensator as previously disclosed. The rear pivotal structure including the rear wheel mounted fork 36 is compatible with any standard multi-speed changer.

The intermediate fork 43 provides clearance for the drive chain 41 from the pivotal structure and leverage for the rear resilient suspenders 46 to suspend the rear of the bicycle. The pivotal intermediate fork 43 also acts as a level from braking torque to perform an important function disclosed further in this text, and for providing the practical location for the rear caliper brake 45 to encompass the advantages of braking and torque with the pivotal action for soft suspension.

The seat stay fork 51 provides pivotal support to the rear pivotal structure and support for the pivoting fulcrum of the intermediate fork 43 in any pivotal position of the components in the pivotal structure.

Seat tube positioning bracket 50 is attached to the rear of the seat tube 13 beneath the bicycle seat, where it does not interfere with the pealing action of the rider. The positioning bracket 50 provides a vertically rigid, though pivotal connection in optimum position for the upper fork legs of the seat stay fork 51 so that its lower fork legs can pivot in the exact arc required as fulcrum support for the intermediate fork 43. The support rollers 47 connected to the seat tube positioning bracket 50 for optimum positioning for the rear suspenders 46 suspending the intermediate fork 43 and avoiding pivotal components for coupling to the seat tube 13.

A rear combination preload/maximum load limiting and shock damping device 54 is coupled between the seat tube 13 in a pivotal fashion, and extender pin 49 to limit pivotal movement of the intermediate fork 43 in the unload direction at the preload pivotal position, cinching the rear bicycle frame when unmounted and minimizing operational bounce, both as disclosed for front preload limiter 28, and limiting pivotal movement substantially at the maximum load position from operational bumps and jumps. The shock damping spring portion of the device 54 softens the shock when the combination limiter halts pivoting of intermediate fork 43.

An optional rear fender 55 can be connected to and pivot with the intermediate fork 43 the same as optional front fender 33 can be connected to and pivot with the front wheel mounted fork 16. Both fenders 33 and 55 would maintain their fixed distance from the specific wheels 19 and 39 to remain effective, when used to shield the rider from water, mud and debris thrown by the wheels.

The importance of compatibility of the improved soft suspension apparatus with popular components by others to enhance the bicycle's performance, is emphasized with the inclusion in FIG. 1 of components such as front and rear fenders 33 and 55, multi-speed changer with operating shift levers 56, front derailleur 57, chain length compensator portion of a rear derailleur 58, front chainguard 59, rear chainguard 60 an front chainwheels 61 and 62. Compatibility for the components by others is a feature of this invention, but the specific components by others are not inferred or claimed as part of the invention.

Figure 2:
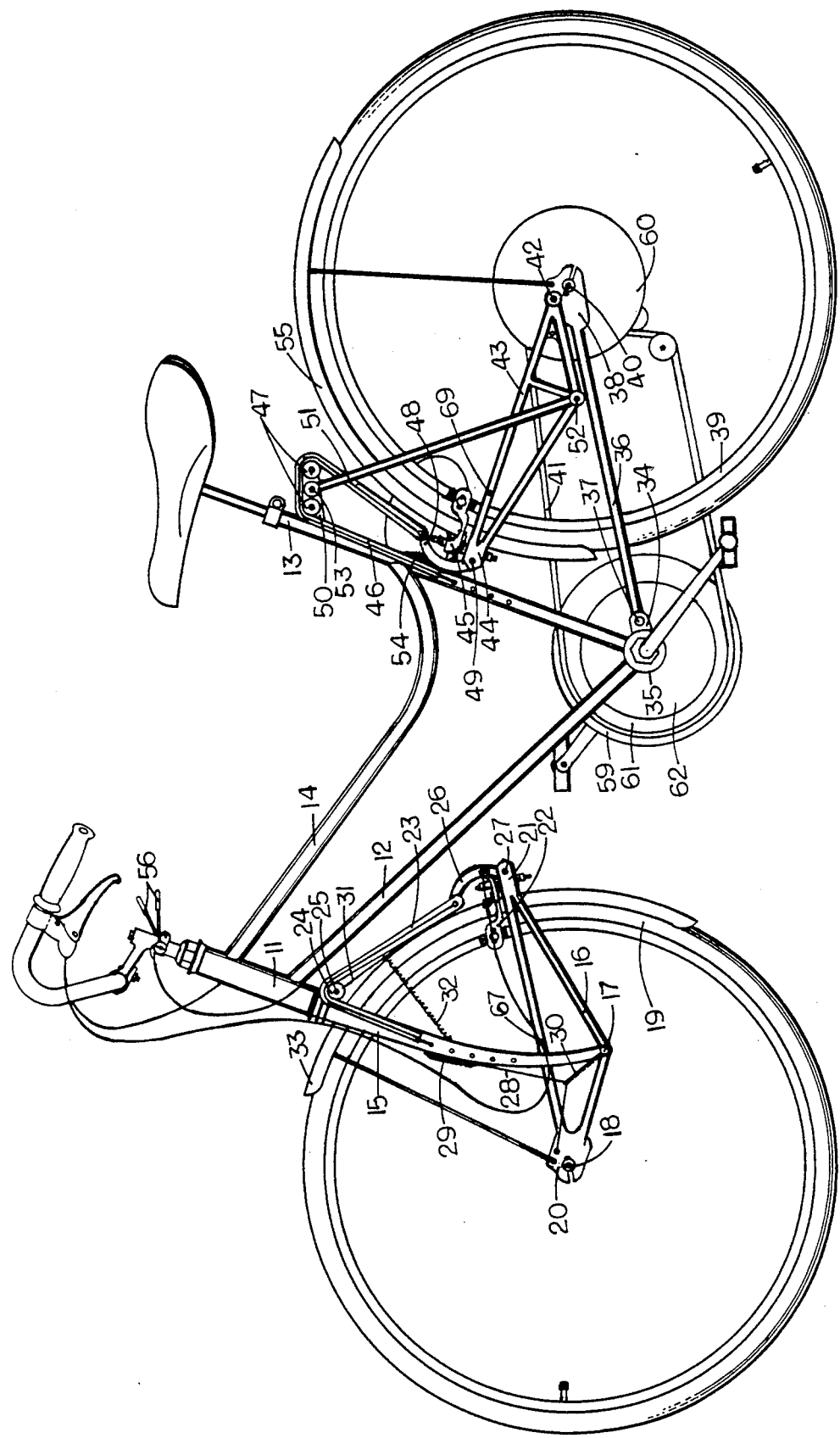
FIG. 2 is a side elevation showing a more basic drawing sufficient to portray the same bicycle as FIG. 1 when subjected to maximum shock from bumps and jumps.

Refer now to FIG. 2 where the same bicycle is portrayed when subjected to maximum shock from bumps and jumps. Compared to FIG. 1 the shoulder connection bracket 21 for front wheel mounted fork 16, is pivoted more rearwardly as shoulder connection bracket 44 for intermediate fork 43 is pivoted more forwardly, front and rear moon extenders 26 and 48 more clearly show their function of insuring clearance for further extended front and rear resilient suspenders 23 and 46 from front and rear caliper brakes 22 and 45. Front preload limiting cables 28 are relaxed, but held clear of wheel spokes by guide springs 30.

Front load limiting cables 31 are taut, as is rear limiter/damping device 54 (not as clearly shown as in FIG. 1.) The wheel end of rear wheel mounted fork 36 has pivoted upward relative to the central frame, and the lower fork legs of seat stay fork 51 having pivoted forwardly.

Refer now to the perspective view of FIG. 3. Front wheel mounted fork 16 shows pivotal movement to the optimum tension position, ostensibly after correct adjustment of the front resilient suspenders 23 under influence of the rider's weight. In the optimum tension position, mounting bracket 21 of the front wheel mounted fork 16 is pivoted rearwardly about ¾ inch from the unmounted, preload pivotal position shown in FIG. 1. This pivotal position slightly extends the front resilient suspender 23, but slightly relaxes preload limiting cables 28.

Refer now to the perspective view of the FIG. 4. Intermediate fork 43 is pivoted to the optimum tension position, ostensibly after correct adjustment of the rear resilient suspenders 46 under influence of the rider's weight. In the optimum tension position, connection bracket 44 of said intermediate fork 43 is pivoted forwardly about ½ inch from the unmounted, preload pivotal position shown in FIG. 1. This position slightly extends the rear resilient suspenders 46, but slightly relaxes limiting/damping device 54 (not as clearly shown as in FIG. 1.)

A transversally attached reinforcing brace 63 shows up in this view near the forward end of substantially parallel legs of the rear wheel mounted fork 36. It will be noted that the space between reinforcing brace 63 and flange pin 37 is dedicated for mounting an optional kick stand.

Another transversally attached reinforcing brace 64 shows up in this view toward the upper end of seat stay fork 51. Aforementioned left and right mounting studs 70 also show up attached to the seat tube positioning bracket 50 for the upper pivotal connection of seat stay fork 51. Aforementioned left and right mounting studs 71 also show up attached to rear wheel plates 38 for the lower pivotal connections of intermediate fork 43.

A roller pin 65, shown at the rear of seat tube positioning bracket 50, also could serve as a forward mounting pin for an optional (pivotal) luggage carrier.

Refer now to perspective views of FIG. 3 and 4. Simple aforementioned adjustments of front and rear resilient suspenders 23 and 46 can be made and subsequently tested by the rider by mounting and sitting on the motionless bicycle in his or her favorite riding position. The favorite riding position pose is important for it distributes the rider's weight to the front and rear suspenders 23 and 46 in a ratio relevant for each resilient suspender tension adjustment. A viewable test can be sighted by the rider from any forward or rearward angle, due to the novel concept of front and rear optimum tension indicators 66 and 68 and definers 67 and 69. These are shown more clearly in FIG. 3a and FIG. 4a near the top of drawings in FIG. 3 and 4. When the front, first optimum tension indicator 66 coupled to the inner left fork leg of steerable fork 15 is aligned in adjacent relation to the front, first optimum tension definer 67 coupled to the outer left fork leg of front wheel mounted fork 16, and the rear, second optimum tension indicator 68 coupled to the inner left fork leg of seat stay fork 51 is aligned in adjacent relation with the rear, second optimum tension definer 69 coupled to the outer left fork leg of intermediate fork 43, the rider is effectively suspended for a soft ride regardless of the rider's weight. From simple one-time instructions, the tension adjustments and subsequent viewable testing with the rider sitting on the motionless bicycle, can be accomplished in a speedy, efficient and effective manner by the unassisted rider, without tools, weighing, measurements or formal training.

The front and rear optimum tension definers 67 and 69 also appear in FIG. 1 and 2, in obviously unaligned tension positions.

The ease of adjustments and/or quick substitution of the front/and or rear resilient suspenders 23 and 46 without the use of tools, make it convenient for the rider to select a softer or stiffer suspension when desirable.

Refer now primarily to FIG. 1. In normal operation, front wheel mounted fork 16 and rear, intermediate fork 43 are capable of pivoting between the preload and maximum load pivotal positions from bumps and jumps. This allows front and rear wheels 19 and 39 (in the standard size adult bicycle shown in the drawings) to each pivot about 2½ inches vertically. Such liberal wheel flexing to accomplish a soft ride, when combined with front and rear brakes 22 and 45 to accomplished effective braking, could be hazardous to the rider without another feature of this invention.

The conventional bicycle is a very unique vehicle regarding its short wheelbase and high rider position relative to the axis of the wheels 19 and 39 which results in a very high center of gravity. During normal, firm front and rear braking on a bicycle with liberal wheel flexing, the high riding position results in the rider accentuating the leverage of the forward rider momentum onto the soft front suspension and would result in a nosedive of the bicycle with its rider. But, with this invention, the nosedive momentum is effectively inverted to put the bicycle and rider in a much more favorable mode during braking.

Refer now primarily to FIG. 3 and 4 for this disclosure. With the rider mounted on the bicycle and in operation, when front and rear brakes 22 and 45 are actuated by the rider, friction between the brakes 22 and 45 and wheels 19 and 39 slows the wheel's forward rotational speed. The friction of front brake 22 mounted on the shoulder of the pivotal, front wheel mounted fork 16 simultaneously and automatically produces a torque on the front wheel mounted fork 16 sufficient to overcome the nosedive momentum, allowing the torque to pivot the brake end of the front wheel mounted fork 16 smoothly forward in the rotational direction of front wheel 19, to its preload pivotal position where it is usually stopped by the preload limiters 28, or a little beyond if the braking is sufficiently intense to stretch shock damping springs 29. The pivoting of front wheel mounted fork 16 on the fulcrum pins 17 from the torque, has allowed the front wheel mounted fork to act as a lever to raise the height of the fulcrum support, consequently raising the height of the front frame relative to the ground, higher than the optimum tension pivotal height, thus inverting nosedive.

Simultaneously with this front occurrence, friction on the rear wheel 39 by rear brake 45 mounted on the shoulder of intermediate fork 43 produces a torque to pivot intermediate fork 43 on the fulcrum support and the brake end to move smoothly forward allowing the intermediate fork 43 to act as a lever to loser the height of the fulcrum support, consequently lowering the rear frame relative to the ground, lower than the optimum tension pivotal height, thus accentuating the inverting of nosedive. This front and rear frame shifting motion by the torque producing braking, enhances controllibility and safety to this soft suspension bicycle rider.

Other configurations of touring, racing and rough terrain bicycles employing the same new and improved advantages of this invention, obviously will yield new benefits and new applications such as the following example:

Extremely popular among youthful riders, rough terrain bicycles, some identified or classified under BMX, if built around these new and improved features, would be able to select their preferance of the quickly interchangeable front and rear resilient suspender strength or adjustment to meet the challenges of bumps, jumps or obstacles. Whether the specific rider's objectives were smoothing the bumps, softer landing from jumps, or strength of catapult over obstacles. With the significant feature of compatibility for front and rear braking and multi-speed selection components, such new and improved rough terrain bicycles would add new dimensions and excitement to rough terrain bicycle competitive endeavors.

Although the detailed embodiment of the invention is illustrated in the drawings and previously described in detail, this invention contemplates any configuration, application, design and relationship of components and selection of conventional, diverse and exotic materials which will function in a similar manner and which will provide equivalent results.

I claim:

1. A soft suspension bicycle having front and rear wheels and a braking means for slowing and stopping, the wheels supporting a frame having a steerable fork frame member, a seat tube surmounted by a seat and a housing for a pedal crank, the improved combination comprises:

(a) a front pivotal fork;
a rear intermediate fork;
a front, first and rear, second braking means, the front pivotal fork being connected to the front wheel and to the frame, the front pivotal fork having the first braking means connected thereon, the rear intermediate fork being connected to the rear wheel and to the frame, the rear intermediate fork having the second braking means connected thereon, first and second braking means producing torque on the front pivotal fork and the rear intermediate fork respectively, to automatically raise the front and lower the rear frame simultaneously with operational braking;

(b) means for limiting pivotal movement of the front pivotal fork and the rear intermediate fork comprising:

at least one preload limiter for each the front pivotal fork and the rear intermediate fork, to halt the front and rear fork movement in preload direction substantially at preload positions;

at least one maximum load limiter for each the front pivotal fork and rear intermediate fork, to halt the front and rear fork movement in maximum load directions at maximum load position;

(c) means for resiliently suspending the front pivotal fork and the rear intermediate fork from the frame comprising:

at least one soft, operationally quiet resilient suspender, capable of retaining its tensile strength for suspension when detoured around rotatable support means;

(d) an means for indicating optimum tension of the resilient means for the bicycle, after tension adjustment according to the weight of a rider.

2. A soft suspension bicycle having front and rear wheels and a braking means for slowing and stopping the bicycle, the wheels supporting a frame having a steerable fork frame member, a seat tube surmounted by a seat and a housing for a pedal crank, the combination having;

(a) means for automatically raising the front of the bicycle frame relative to the ground simultaneously with operational braking comprises:

a pivotal front wheel mounted fork, pivotally connected to the steerable fork as fulcrum support for the front wheel mounted fork;

a shoulder bracket, to unite shoulder members of the front wheel mounted fork;

a braking means mounted on the shoulder bracket of the front wheel mounted fork producing torque to permit the front wheel mounted fork to act as a lever to raise the height of the fulcrum support simultaneously with operational braking comprising:

a rear pivotal structure having;
a seat stay fork;
an intermediate fork;
a rear wheel mounted fork, the seat stay fork is pivotally connected on one end to a member of the frame to support the pivotal structure, and the other end to the intermediate fork as its fulcrum support;

a shoulder bracket to unite shoulder members of the intermediate fork;

a rear, second braking means mounted on the shoulder bracket of the intermediate fork producing torque to permit the intermediate fork to act as a lever to lower the height of the fulcrum support simultaneously with operational braking the intermediate fork being pivotally connected to the rear wheel mounted fork in adjacent relation to an axis of the rear wheel, the rear wheel mounted fork being pivotally connected to the housing for a pedal crank to support the rear wheel, (c) means for resiliently suspending the frame raising and lowering means from the comprising:

at least one, first resilient suspender which suspends the front wheel mounted fork from the frame by first adjustable coupling means, at least one second resilient suspender which suspends the intermediate fork from the frame by a second adjustable coupling means, the resilient suspenders utilizing a soft, operationally quiet elastomeric material capable of retaining its tensile strength for suspension when detoured around rotatable supporting means;

(d) means for indicating optimum tension of the resilient suspenders after tension adjustment according to the weight of a rider comprising:

a first indicator coupled to the steerable fork;

a first definer coupled to the front wheel mounted fork and aligned in adjacent relation with the first indicator when the front wheel mounted fork is pivoted to an optimum tension position after tension adjustments, second optimum tension indicator coupled to the seat stay fork and second definer coupled to the intermediate fork and aligned in adjacent relation with the second indicator when the intermediate fork is pivoted to an optimum tension position after tension adjustments.

3. A soft suspension bicycle as recited in claim 2, wherein the pivotal front wheel mounted fork comprises:

at least one preload limiting means, having, at least one shock damper for the preload limiting means, to soften the shock when the preload limiting means limits pivotal movement of the front wheel mounted fork in an unload direction substantially at a preload position.

4. A soft suspension bicycle as recited in claim 2, wherein the front wheel mounted fork comprises:

at least one maximum load limiter, to limit pivotal movement of the front wheel mounted fork in a maximum load direction at a maximum load position.

5. A soft suspension bicycle as recited in claim 2, wherein the pivotal intermediate fork comprises:

preload and maximum load limiting means, having, a shock damper, for softening the shock when the limiting means limits pivotal movement of the intermediate fork in an unload direction at a preload pivotal position, the limiting means limit pivotal movement of the intermediate fork in a maximum load direction at a maximum load pivotal position.

6. A soft suspension bicycle as recited in claim 2, wherein the seat stay fork is pivotally connected to a member of the frame which comprises:

a seat tube positioning means for providing a vertically rigid, though pivotal connection in optimum position for upper members of the seat stay fork.

7. A soft suspension bicycle as recited in claim 2, wherein the pivotal rear wheel mounted fork maintains a distance equal to the space between an axis of the pedal crank and the axis of the rear wheel during operational pivoting of the rear wheel mounted fork.

8. A soft suspension bicycle as recited in claim 2, wherein the pivotal front wheel mounted fork is a scalene quad-triangular fork.

9. A soft suspension bicycle as recited in claim 2, wherein the pivotal intermediate fork is a scalene quad-triangular fork.

* * * * *